(No Model.) 2 Sheets—Sheet 1.

P. L. SENAT.
ATTACHMENT FOR PHOTOGRAPHIC CAMERAS.

No. 367,013. Patented July 19, 1887.

Witnesses
John E. Parker
Hamilton D. Turner.

Inventor:
Prosper L. Senat,
By his Attorneys Howson & Sons (No Model.) 2 Sheets—Sheet 2.
P. L. SENAT.
ATTACHMENT FOR PHOTOGRAPHIC CAMERAS.
No. 367,013. Patented July 19, 1887.
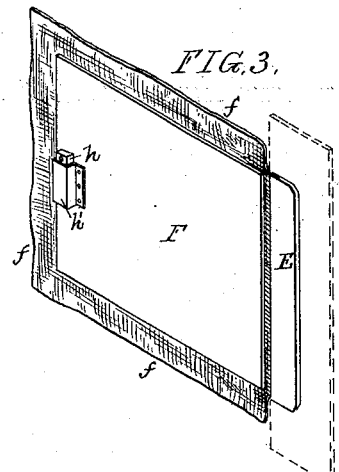
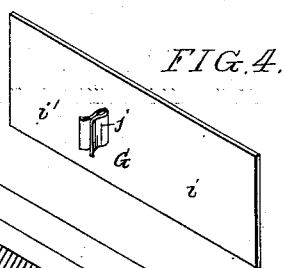
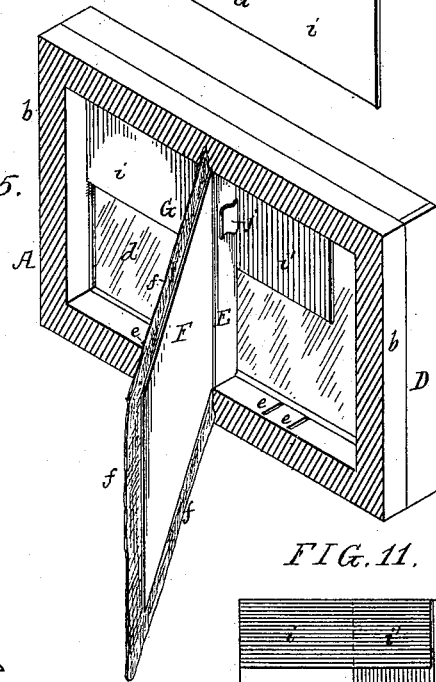
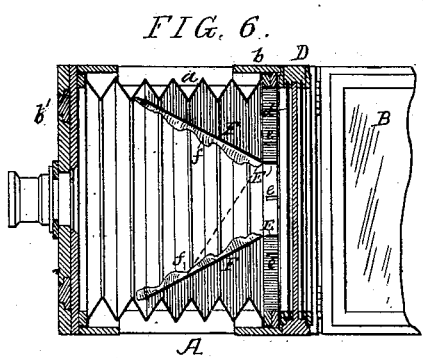
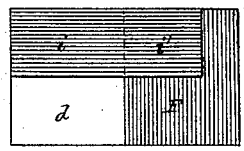
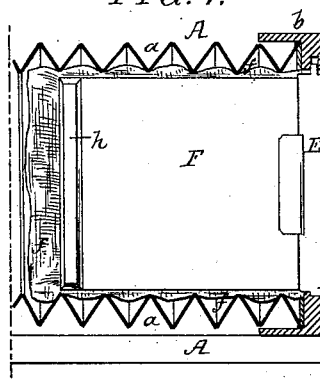
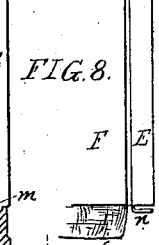
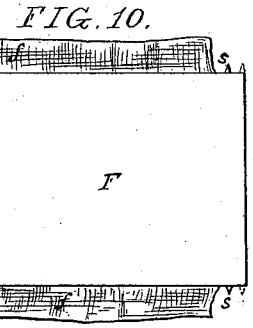
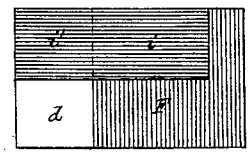
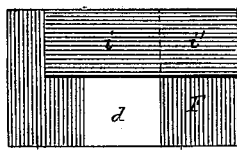
Witnesses
Joseph H. Klein.
C. M. Divine.
Inventor:
Prosper L. Senat.
by his Attorneys
Howson & Sons

UNITED STATES PATENT OFFICE.

PROSPER L. SENAT, OF PHILADELPHIA, PENNSYLVANIA.

ATTACHMENT FOR PHOTOGRAPHIC CAMERAS.

SPECIFICATION forming part of Letters Patent No. 367,013, dated July 19, 1887.

Application filed May 9, 1887. Serial No. 237,580. (No model.)

*To all whom it may concern:*

Be it known that I, PROSPER L. SENAT, a citizen of the United States, and a resident of Philadelphia, Pennsylvania, have invented certain Improved Attachments for Photographic Cameras, of which the following is a specification.

The object of my invention is to so construct and apply an attachment to a photographic camera that a portion only of the sensitive plate may be exposed, so that the plate can have two or more pictures formed upon it, as desired.

Figure 1:
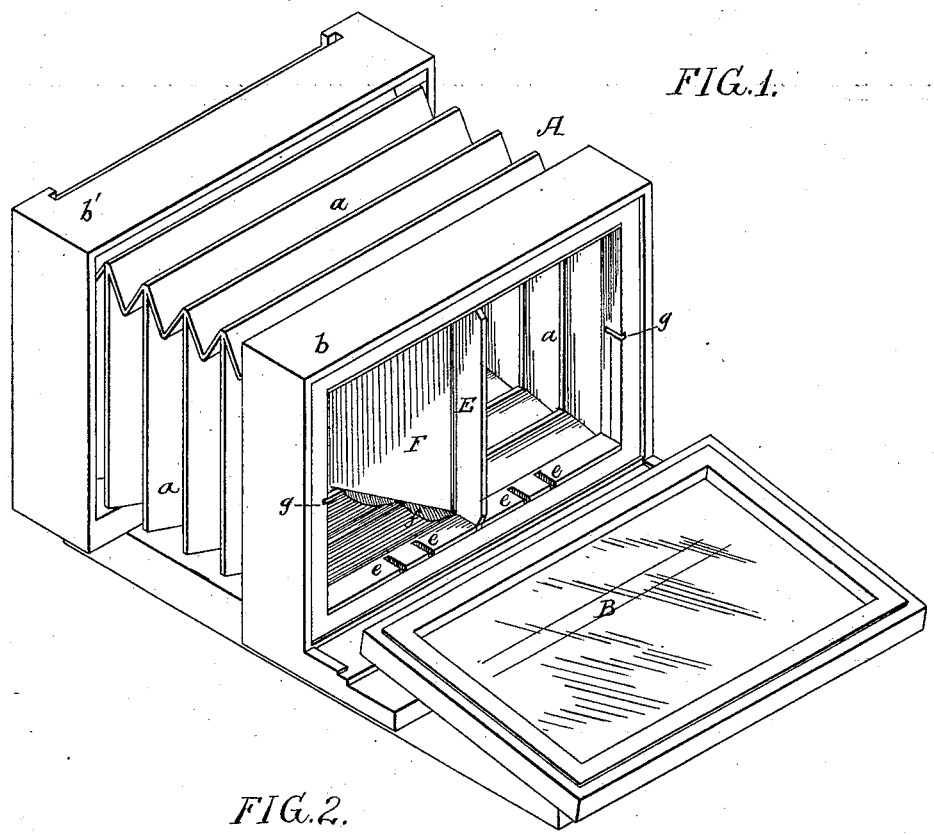
Figure 2:
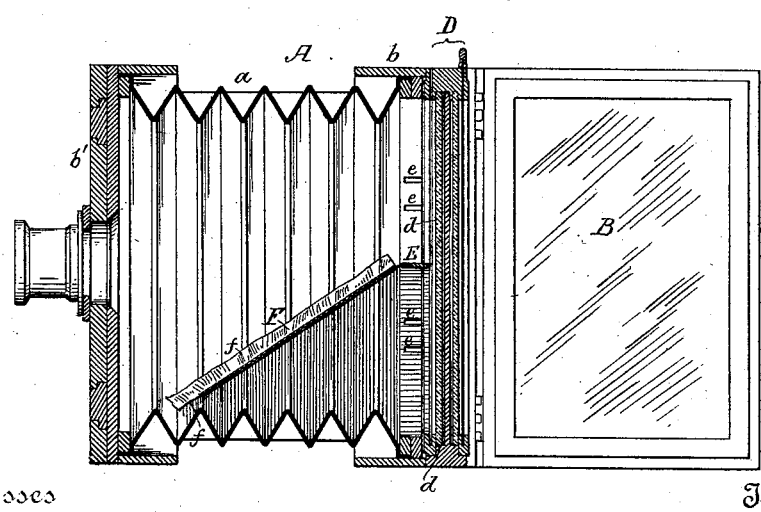

In the accompanying drawings, Figure 1 is a perspective view of a camera with my attachment, the latter being so applied as to expose but one-half of the plate. Fig. 2 is sectional plan view of Fig. 1 with the plate-holder in position. Fig. 3 is a view of the attachment in its simplest form. Fig. 4 is a perspective view of a blocking-out plate to be secured to the attachment. Fig. 5 is a sectional perspective view of the rear portion of the camera, showing my attachment with blocking-out plate applied thereto. Fig. 6 is a sectional plan view of the camera, showing the use of two attachments. Figs. 7, 8, 9, and 10 are views showing minor details of construction; and Figs. 11, 12, and 13 are diagrams illustrating the action of the blocking-out plate used with the attachment.

In using photographic cameras it is often desirable to make independent pictures on different parts of a single plate, or to limit the area of plate exposed for other purposes; and it has been hitherto proposed to provide a camera with pivoted internal shutters having spindles which project through the box, and by which the shutters can be swung to and fro. This not only necessitates a special camera for the purpose, but is quite an expensive contrivance, and the variations in the character of the exposure are limited. My improved attachment, on the contrary, is simple and inexpensive, and such that it can be readily applied to any ordinary camera and adjusted so as to expose any desired fraction of the plate.

Referring to Figs. 1 and 2, A is the camera-box; $b'$, the front frame of the same; $a$, the bellows-extension; $b$, the rear frame; B, the ground-glass frame; D, a plate-holder of the usual form, and $d$ the plate a portion of which is to be exposed.

In that form of the attachment shown in Figs. 1 and 2, E is a stiff strip, of metal, wood, pasteboard, or other available material, extending from top to bottom of the camera and adapted to grooves $e$ in the top and bottom of the back frame, $b$. I have shown in the present instance five grooves, $e$, for effecting the division of the box into halves, quarters, and thirds, and I have also shown grooves, $g$, at the side of the box for the reception of a transverse attachment.

To the strip E, I hinge a wing, F, which extends into the camera, as shown in Fig. 2. This wing is hinged in any suitable manner; but I prefer to use a strip of fabric, as shown, the fabric being such as will prevent the access of light to the portion of the box that is shut off by the wing.

Around the wing F is a flap, $f$, of fabric, also impervious to light, the purpose of this flap being to cut off any rays of light that might otherwise pass around the edges of the wing.

I make the strip E somewhat larger than is required for the size of camera for which the attachment is intended, as shown by dotted lines in Fig. 3, so that the purchaser can cut away the surplus portion until the strip fits the box, as cameras often vary slightly in the size of the opening.

In some instances a weight, $h$, may be used upon the free end of the wing F, said weight being secured permanently to the wing, as shown in Fig. 7, or detachably secured thereto, as shown in Fig. 3, in which the weight is represented as fitted in a suitable pocket, $h'$. This weight is for the purpose of causing the shifting of the wing from one side of the camera to the other by simply tipping the camera to one side without removing the plate-holder.

In Fig. 6 I have shown two attachments, one cutting off a portion of each side of the camera so as to expose the central portion of the plate, after which either of the wings may be thrown over, as shown by dotted lines, for instance, so as to expose either of the end portions of the plate.

The attachment described provides for dividing the plate into sections vertically. To divide the plate horizontally, I use the attachment illustrated in Fig. 4, which is simply a plate, G, having a spring-catch, j, whereby it is applied to the strip E, the portion i on one side of said catch being equal in area to one-quarter of the sensitive plate d, the portion i' on the other side equaling one-sixth of said plate d in area.

To expose one-quarter of the plate d, I apply the strip E to the central grooves, e, of the box, so as to divide the camera into halves, the wing F protecting one-half the plate, and the portion i of the plate G one-half of the exposed portion of the same, thus leaving but one-quarter exposed, as shown by lines in Fig. 11.

If the operator wishes to make six different exposures on the plate, the strip is adjusted so that two-thirds of the plate will be protected by the wing F and one-sixth of the plate by the portion i' of the plate G, leaving the remaining one-sixth of the plate to be exposed, as shown in the diagram, Fig. 12.

In exposing the center of the plate the wing F is caused to protect one-third of the plate, the slide of the plate-holder protecting the opposite third, and the central portion being partially covered by the portion i of the plate G, as shown in Fig. 13.

The attachment may, if desired, be made as shown in Fig. 7, the strip E having a squared lower portion, m, and a pin, m', at the upper end, and being made slightly less in height than the opening in the frame b of the camera.

The opening for the pin m' is slightly deeper than the length of the pin, so that by fully inserting the pin and then dropping the portion m into its socket the attachment will be rigidly held in place.

In Fig. 8 I have shown an attachment provided with spring-fingers n at top and bottom, the device in this case being, if desired, made in one piece—that is to say, the spring-fingers being connected directly to the wing F and the strip E being dispensed with, the fingers permitting any desired lateral or angular adjustment of the wing and also preventing the accidental longitudinal displacement of the attachment.

The wing may, if desired, have a spring-finger at top or bottom only, a pin being provided on the other edge, as shown in Fig. 9, for instance. In this case also I have shown the wing with a flap, f', on the rear edge, this flap bearing against the plate d and being used, mainly, for long exposures.

In Fig. 10 I have shown an attachment made of a flexible piece of card-board, having secured to it two small pins, s, so that by slightly bending the card-board the attachment can be inserted in the camera, the pins engaging with the top and bottom of the frame b and holding the attachment firm enough for the purpose required.

I have found by experiment that in case of short exposures the attachment need not bear against the sensitive plate in order to exclude the light from the protected portion of said plate, the narrow space between the protector and the plate, as shown in Fig. 2, having no bad effect so long as the direct rays of light from the lens are cut off. If, however, the attachment does not extend to or almost to the rear end of the box, light is liable to gain access to the protected portion of the plate and blur and fog the picture formed or to be formed thereon.

In some cases the attachment may be secured directly to the plate-holder, the pivot-pin being at the end of the wing F, as shown by dotted lines in Fig. 10.

I claim as my invention—

1. An attachment for photographic cameras, consisting of a wing constructed for application to and removal from an ordinary camera and extending into the box, so as to cut off the light from a portion of the plate to be exposed, substantially as described.

2. The combination, in an attachment for photographic cameras, of a strip constructed for application to the rear of the box, and having pivoted thereto a wing adapted to swing from side to side of the box, substantially as described.

3. An attachment for photographic cameras, consisting of a wing, F, projecting into the box, and having a flexible flap around said projecting portion of the same, all substantially as described.

4. An attachment for photographic cameras, consisting of a pivoted wing for protecting a portion of the plate to be exposed, said wing being weighted so that on tilting the box the wing is caused to swing from one side of the same to the other, all substantially as and for the purpose set forth.

5. The combination of a camera-box with a cutting-off attachment consisting of a wing extending into the box, and means whereby said attachment can be adjusted and retained laterally in different positions in the opening at the rear of the box, all substantially as specified.

6. The combination of a camera-box having in the frame recesses dividing the opening into quarters and thirds, with an attachment having a portion adapted to these recesses, and a wing extending into the camera, substantially as described.

7. The combination of an attachment extending into a camera-box and protecting a portion of the plate, with a blocking-out plate adapted to be secured to the attachment and to cover a portion of the plate not protected by the latter, all substantially as described.

8. The combination of the protecting attachment with a blocking-out plate having a device for securing it to said attachment, the portions of the plate on opposite sides of said securing device being of different size, all substantially as specified.

9. The combination of a camera-box with a removable protecting-wing projecting into said box, and a spring-finger carried by said wing and bearing at top or bottom against the frame of the box, all substantially as specified.

10. The combination of a camera-box with a removable plate-protecting attachment consisting of a wing projecting into the box and having at the rear edge a flexible flap for bearing upon the plate, all substantially as specified.

In testimony whereof I have signed my name to this specification in the presence of two subscribing witnesses.

PROSPER L. SENAT.

Witnesses:
WILLIAM D. CONNER,
HENRY HOWSON.